(12) United States Patent
Yeo et al.

(10) Patent No.: US 7,957,054 B1
(45) Date of Patent: Jun. 7, 2011

(54) ELECTRO-OPTICAL DISPLAY SYSTEMS

(75) Inventors: Jong-Souk Yeo, Corvallis, OR (US); Stephen Kitson, Bristol (GB); Michael G. Groh, Albany, OR (US); Bret Mchuron-Guss, Blodgett, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/643,756

(22) Filed: Dec. 21, 2009

(51) Int. Cl.
*G02B 26/00* (2006.01)

(52) U.S. Cl. ........................................ 359/296; 359/245

(58) Field of Classification Search .................. 359/296
See application file for complete search history.

(56) References Cited

U.S. PATENT DOCUMENTS

| | | | |
|---|---|---|---|
| 3,668,106 A | 6/1972 | Ota | |
| 3,806,893 A | 4/1974 | Ohnishi et al. | |
| 3,850,627 A | 11/1974 | Wells et al. | |
| 3,892,568 A | 7/1975 | Ota | |
| 4,041,481 A | 8/1977 | Sato | |
| 4,045,327 A | 8/1977 | Noma et al. | |
| 4,068,927 A | 1/1978 | White | |
| 4,071,430 A | 1/1978 | Liebert | |
| 4,088,395 A | 5/1978 | Gigila | |
| 4,123,346 A | 10/1978 | Ploix | |
| 4,126,854 A | 11/1978 | Sheridon | |
| 4,149,149 A | 4/1979 | Miki et al. | |
| 4,203,106 A | 5/1980 | Dalisa et al. | |
| 4,218,302 A | 8/1980 | Dalisa et al. | |
| 4,305,807 A | 12/1981 | Somlyody | |
| 4,408,202 A | 10/1983 | Fales | |
| 4,418,346 A | 11/1983 | Batchelder | |
| 4,430,648 A | 2/1984 | Togashi et al. | |
| 4,450,440 A | 5/1984 | White | |
| 4,522,472 A | 6/1985 | Liebert et al. | |
| 4,648,956 A | 3/1987 | Marshall et al. | |
| 4,726,662 A | 2/1988 | Cromack | |
| 4,732,456 A | 3/1988 | Fergason et al. | |
| 4,741,604 A | 5/1988 | Kornfeld | |
| 4,772,102 A | 9/1988 | Fergason et al. | |
| 4,824,208 A | 4/1989 | Fergason et al. | |
| 4,832,458 A | 5/1989 | Fergason et al. | |

(Continued)

FOREIGN PATENT DOCUMENTS

DE 4431441 C1 2/1996

(Continued)

OTHER PUBLICATIONS

Kishi, E. et al., "5.1: Development of In-Plane EPD", SID 2000 Digest, p. 24-27.

(Continued)

*Primary Examiner* — Ricky L Mack
*Assistant Examiner* — James C Jones (57) ABSTRACT

Electro-optical display systems are disclosed. An electro-optical display system may include a plurality of electrodes; a display volume containing a fluid having a plurality of colorant particles; a layer adjacent to or part of at least one electrode of the plurality of electrodes and configured to at least one of (i) reflect at least one wavelength of light and (ii) absorb at least one wavelength of light; and recessed regions configured to contain the plurality of colorant particles, wherein the plurality of electrodes are configured to selectively move the plurality of colorant particles between a compacted position in which all or nearly all of the plurality of colorant particles are in the recessed regions, and a spread position in which the plurality of colorant particles are spread across the display volume.

19 Claims, 5 Drawing Sheets

U.S. PATENT DOCUMENTS

| | | | |
|---|---|---|---|
| 5,057,244 A | 10/1991 | Nitta et al. | |
| 5,105,185 A | 4/1992 | Nakanowatari et al. | |
| 5,223,115 A | 6/1993 | DiSanto et al. | |
| 5,223,823 A | 6/1993 | DiSanto et al. | |
| 5,250,932 A | 10/1993 | Yoshimoto et al. | |
| 5,250,938 A | 10/1993 | Disanto et al. | |
| 5,254,981 A | 10/1993 | DiSanto et al. | |
| 5,293,528 A | 3/1994 | DiSanto et al. | |
| 5,302,235 A | 4/1994 | DiSanto et al. | |
| 5,304,439 A | 4/1994 | DiSanto et al. | |
| 5,315,312 A | 5/1994 | DiSanto et al. | |
| 5,345,251 A | 9/1994 | DiSanto et al. | |
| 5,359,346 A | 10/1994 | DiSanto et al. | |
| 5,389,945 A | 2/1995 | Sheridon | |
| 5,402,145 A | 3/1995 | Disanto et al. | |
| 5,412,398 A | 5/1995 | DiSanto et al. | |
| 5,460,688 A | 10/1995 | DiSanto et al. | |
| 5,467,107 A | 11/1995 | DiSanto et al. | |
| 5,499,038 A | 3/1996 | DiSanto et al. | |
| 5,561,443 A | 10/1996 | Disanto et al. | |
| 5,565,885 A | 10/1996 | Tamanoi | |
| 5,575,554 A | 11/1996 | Guritz | |
| 5,627,561 A | 5/1997 | Laspina et al. | |
| 5,684,501 A | 11/1997 | Knapp et al. | |
| 5,689,282 A | 11/1997 | Wolfs et al. | |
| 5,717,515 A | 2/1998 | Sheridon | |
| 5,729,663 A | 3/1998 | Lin et al. | |
| 5,739,801 A | 4/1998 | Sheridon | |
| 5,745,094 A | 4/1998 | Gordon, II et al. | |
| 5,786,875 A | 7/1998 | Brader et al. | |
| 6,177,921 B1 | 1/2001 | Comiskey et al. | |
| 6,225,971 B1 | 5/2001 | Gordon, II et al. | |
| 6,271,823 B1 | 8/2001 | Gordon, II et al. | |
| 6,323,989 B1 | 11/2001 | Jacobson et al. | |
| 6,574,034 B1 | 6/2003 | Lin et al. | |
| 6,577,433 B1 | 6/2003 | Lin et al. | |
| 6,639,580 B1 | 10/2003 | Kishi et al. | |
| 6,710,540 B1 | 3/2004 | Albert et al. | |
| 6,806,995 B2 | 10/2004 | Chung et al. | |
| 6,897,996 B2 | 5/2005 | Ikeda et al. | |
| 6,967,763 B2 | 11/2005 | Fuji et al. | |
| 7,034,987 B2 | 4/2006 | Schlangen | |
| 7,038,656 B2 | 5/2006 | Liang et al. | |
| 7,053,882 B2 | 5/2006 | Weisbuch et al. | |
| 7,116,466 B2 | 10/2006 | Whitesides et al. | |
| 7,123,238 B2 | 10/2006 | Lin et al. | |
| 7,230,751 B2 | 6/2007 | Whitesides et al. | |
| 7,277,219 B2 | 10/2007 | Ikeda | |
| 7,304,787 B2 | 12/2007 | Whitesides et al. | |
| 7,352,353 B2 | 4/2008 | Albert et al. | |
| 7,365,732 B2 | 4/2008 | Matsuda et al. | |
| 7,408,699 B2 | 8/2008 | Wang et al. | |
| 7,433,113 B2 | 10/2008 | Chopra et al. | |
| 7,440,159 B2 | 10/2008 | Yang et al. | |
| 7,443,570 B2 | 10/2008 | Chopra et al. | |
| 7,554,716 B2 | 6/2009 | Kita et al. | |
| 2002/0151246 A1* | 10/2002 | Ikeda et al. | 445/24 |
| 2003/0013238 A1 | 1/2003 | Ogawa | |
| 2005/0052402 A1 | 3/2005 | Kitano et al. | |
| 2005/0266590 A1 | 12/2005 | Roh et al. | |
| 2005/0285816 A1 | 12/2005 | Glass | |
| 2006/0087489 A1 | 4/2006 | Sakurai et al. | |
| 2007/0075941 A1 | 4/2007 | Zhou et al. | |
| 2007/0103428 A1 | 5/2007 | Kazmaier et al. | |
| 2007/0109622 A1 | 5/2007 | Matsuda | |
| 2007/0205979 A1 | 9/2007 | Bigelow et al. | |
| 2007/0268560 A1 | 11/2007 | Chopra et al. | |
| 2008/0100906 A1* | 5/2008 | Iftime et al. | 359/296 |
| 2008/0117165 A1 | 5/2008 | Machida et al. | |
| 2008/0225374 A1 | 9/2008 | Hayes et al. | |
| 2008/0261159 A1 | 10/2008 | Chopra et al. | |
| 2008/0266646 A1 | 10/2008 | Wilcox et al. | |
| 2009/0103159 A1 | 4/2009 | Cheng et al. | |
| 2009/0122390 A1 | 5/2009 | Liang et al. | |
| 2009/0232509 A1 | 9/2009 | Heikenfeld et al. | |

FOREIGN PATENT DOCUMENTS

| | | |
|---|---|---|
| DE | 19500694 A1 | 8/1996 |
| EP | 0361420 A2 | 4/1990 |
| EP | 0404545 A2 | 12/1990 |
| EP | 0443571 A2 | 8/1991 |
| EP | 0186710 B1 | 10/1992 |
| EP | 0684579 A2 | 11/1995 |
| EP | 0525852 B1 | 5/1996 |
| EP | 1370904 B1 | 7/2006 |
| EP | 1714186 B1 | 11/2007 |
| GB | 2306229 A | 4/1997 |
| JP | 55096922 A | 7/1980 |
| JP | 62058222 A | 3/1987 |
| JP | 64086116 | 3/1989 |
| JP | 60089081 | 3/1994 |
| JP | 7036020 | 2/1995 |
| JP | 9031453 | 2/1997 |
| JP | 10149118 A | 6/1998 |
| WO | 9217873 A1 | 10/1992 |
| WO | 9220060 A1 | 11/1992 |
| WO | 9221733 A1 | 12/1992 |
| WO | 9302443 A1 | 2/1993 |
| WO | 9304458 A1 | 3/1993 |
| WO | 9304459 A1 | 3/1993 |
| WO | 9305425 A1 | 3/1993 |
| WO | 9307608 A1 | 4/1993 |
| WO | 9317414 A1 | 9/1993 |
| WO | 9506307 A1 | 3/1995 |
| WO | 9507527 A1 | 3/1995 |
| WO | 9510107 A1 | 4/1995 |
| WO | 9735298 A1 | 9/1997 |
| WO | 9819208 A1 | 5/1998 |
| WO | 2005093508 A1 | 10/2005 |
| WO | 2006016302 A2 | 2/2006 |
| WO | 2007042950 A2 | 4/2007 |
| WO | 2008007300 A1 | 1/2008 |

OTHER PUBLICATIONS

Swanson, Sally A. et al, "5.2: High Performance Electrophoretic Displays", SID 2000 Digest, p. 29-31.

Lenssen, Kars-Michiel H. et al., "46.1: Invited Paper: Novel Design for Full-Color Electronic Paper", SID 2008 Digest, p. 685-688.

* cited by examiner

ELECTRO-OPTICAL DISPLAY SYSTEMS

BACKGROUND

Electro-optical or electrokinetic display systems are information displays that form visible images using one or more of electrophoresis, electro-convection, electrochemical interaction and/or other electrokinetic phenomena. Those display systems may have a plurality of states, including a transparent (or clear) state and a colored (or dark) state. For example, electro-optical display systems that use electrophoretic phenomena to translate or move colorant particles may collect those particles at least substantially out of the viewing area of the display system to create a transparent state. The colorant particles also may be spread across the viewing area of the display to create a colored state.

DETAILED DESCRIPTION

Figure 1:
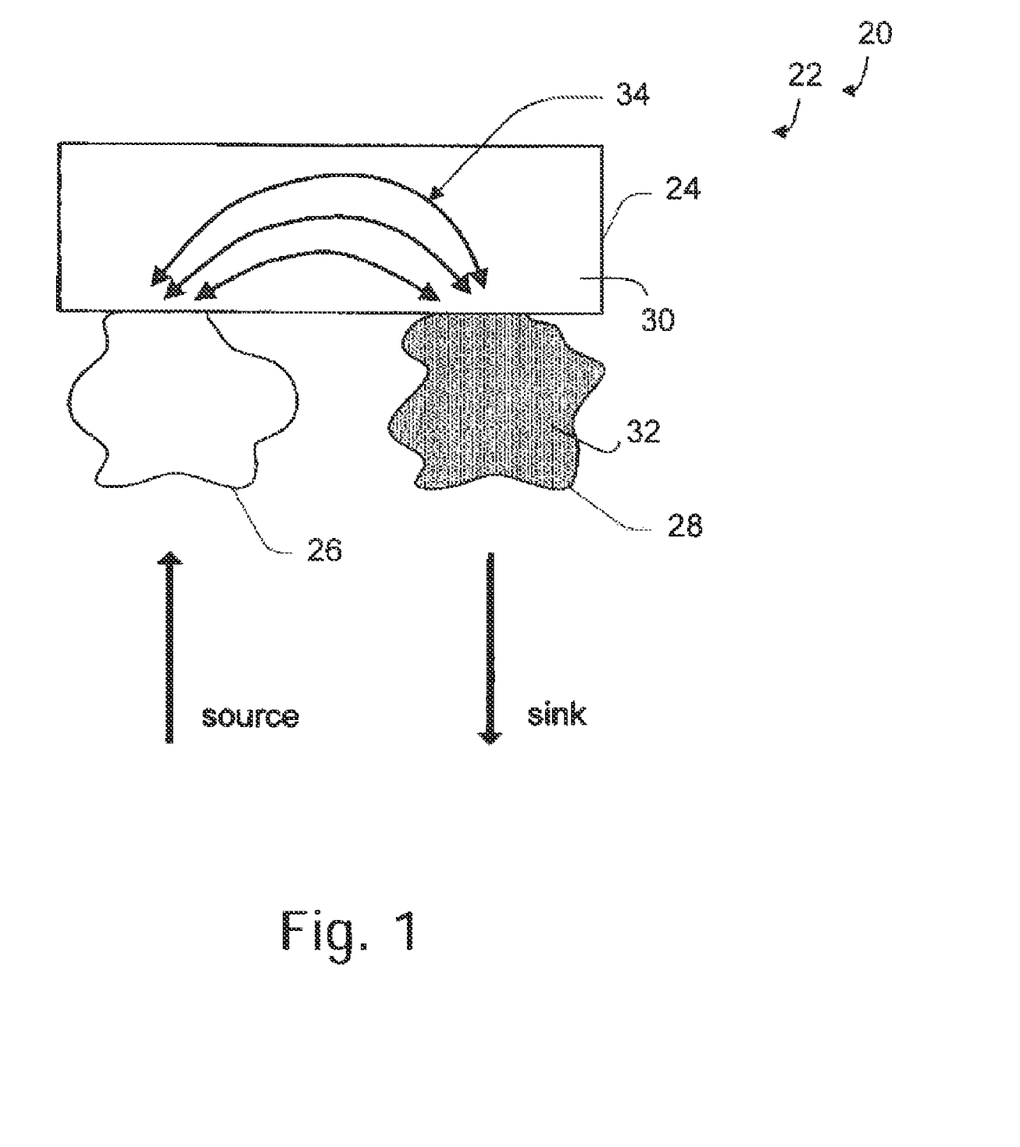
FIG. 1 is a block diagram of a display element of an electro-optical display system in accordance with an embodiment of the invention.

FIG. 1 shows an example of an electro-optical display system 20 having one or more display elements 22. Display element 22 may be a segment, a pixel, a sub-pixel, or a super-pixel having two or more pixels. Display element 22 may include a display volume 24, a source 26 and a sink 28. Display volume 24, source 26 and sink 28 may be fluidly connected and may contain a carrier fluid 30 having a plurality of colorant particles 32. Source 26 may include colorant particles 32 that may be selectively controlled to enter display volume 24. Sink 28 may receive colorant particles 32 from display volume 24. However, the roles of source 26 and sink 28 may be reversed during operation of display element 22. In other words, source 26 may become sink 28, and vice-versa. Flow lines 34 may illustrate movement of colorant particles 32 from source 26 to sink 28 with convective movement of carrier fluid 30.

Colorant particles 32 may have any suitable size, such as between several nanometers and several microns. Additionally, colorant particles 32 may have the property of changing the spectral composition of the incident light by absorbing and/or scattering certain portions of the spectrum. As a result, colorant particles 32 may appear colored which provides a desired optical effect. Carrier fluid 30 may have colorant particles 32 with a single color or may have two or more sets of colorant particles with each set having a different color from the other sets. Although display system 20 is shown to include colorant particles 32, the display system may alternatively, or additionally, include one or more other suitable colorant technologies, such as dyed fluids, charged inks, oil films, etc.

The convective currents illustrated by flow lines 34 of display element 22 may lead to any suitable movement of colorant particles 32, such as out-of-plane movement (substantially transverse to substrate) as well as in-plane movement (substantially parallel to substrate), to provide the desired optical appearance. Additionally, the convective currents may be generated in one or more suitable ways. For example, the convective currents may be generated by unbalanced volumetric forces inside the fluids that cause different parts of the fluid to move relative to each other. Additionally, the convective currents may occur under gravity if different parts of the fluid have different density caused, for example, by localized heating.

Moreover, convective currents may be generated by pressure or concentration gradients inside the fluid produced by localized chemical reactions, localized heating or other disturbances. Furthermore, convective currents may occur if there are ionic currents in the fluid caused by external electric fields (AC or DC) and there is charge injection into the fluid. The moving ions may then create the pressure gradient through viscous drag and excluded volume effects. Such convective currents may sometimes be referred to as "electro-convective currents." Although particular examples of generating the convective currents are described above, display system 20 may alternatively, or additionally, use any suitable physical principles to repel, attract, move, compress, concentrate or disperse colorants, such as electrokinetics, electrophoretics, electrowetting and electrofluidics.

Figure 2:
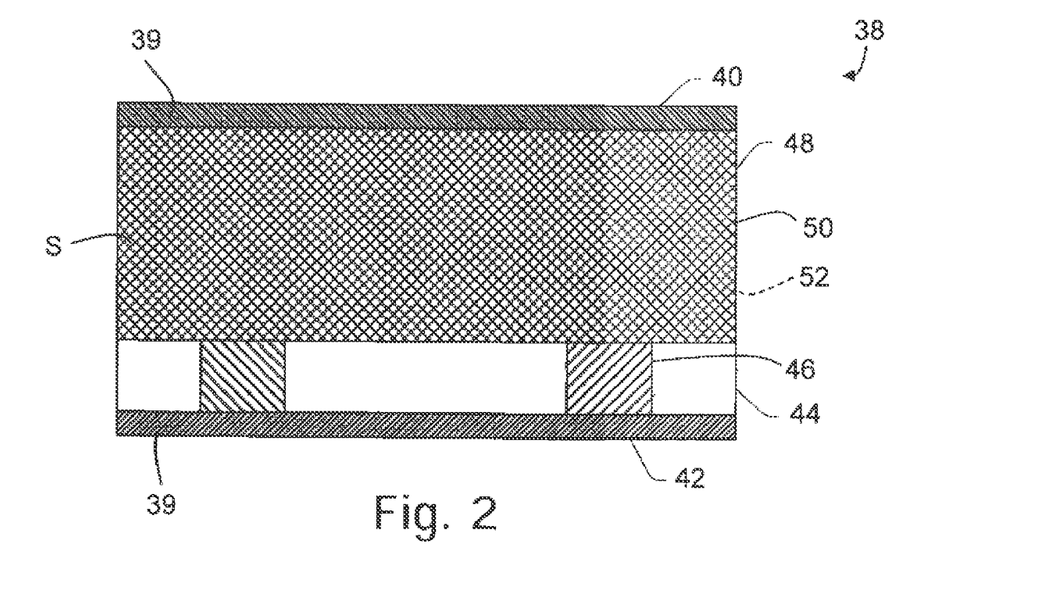
FIG. 2 is a block diagram of an example of the display element of the electro-optical display system of FIG. 1, shown in a colored state in accordance with an embodiment of the invention.
Figure 3:
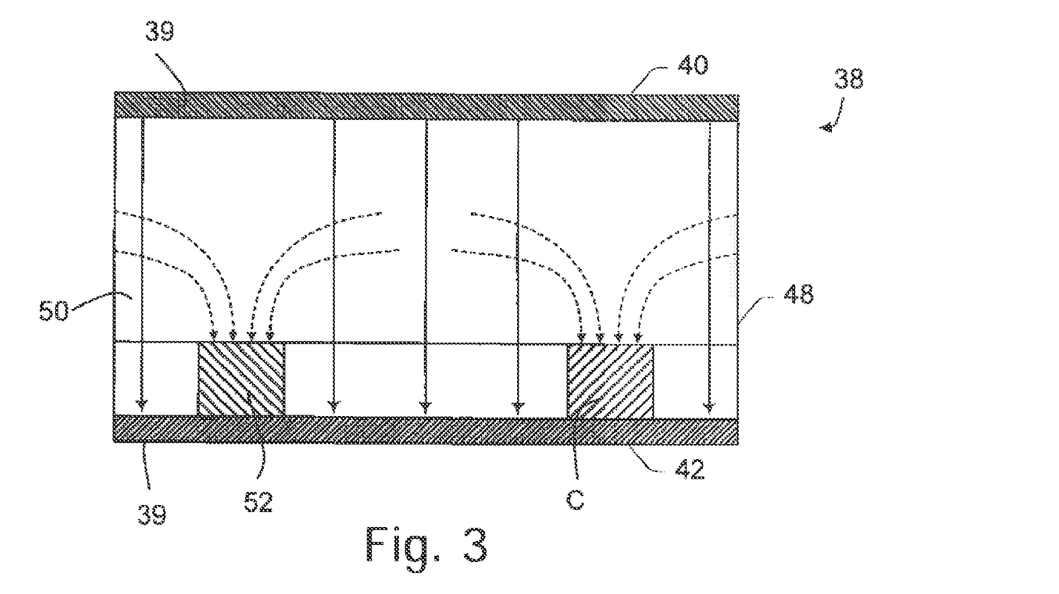
FIG. 3 is a block diagram of the display element of FIG. 2, shown in a transparent state in accordance with an embodiment of the invention.

FIGS. 2-3 illustrate an example of a display element 38 for electro-optical display system 20. Unless specifically excluded, display element 38 may include one or more components and/or one or more functions of the other display elements in this disclosure. Display element 38 may be a segment, a pixel, a sub-pixel, or a super-pixel having two or more pixels of electro-optical display system 20. Additionally, the layers of display element 38 shown in FIGS. 2-3 are for illustration only and may not represent the relative size or thickness of each layer. Display element 38 may include a plurality of electrodes 39, which may be arranged in any suitable way. For example, two or more electrodes of the plurality of electrodes 39 may be coplanar and/or one or more of the plurality of electrodes 39 may be opposed electrodes. Plurality of electrodes 39 may include a first electrode 40 and a second electrode 42. First electrode 40 may be the conceptual "source" and may be made of transparent or opaque material(s), while second electrode 42 may be the conceptual "sink" and may be made of transparent or opaque material(s).

A dielectric layer 44 may be disposed, deposited or formed on second electrode 42. Dielectric layer 44 may be transparent and/or may include one or more colorant particles 32, including colorant dyes and/or pigments. Dielectric layer 44 may include recessed regions 46, which may be any suitable size(s) and/or shape(s). For example, recessed regions 46 may be configured to contain a plurality of colorant particles 32 of display element 38. Although dielectric layer 44 is shown to be formed on second electrode 42, the dielectric layer may alternatively, or additionally, be formed on first electrode 40.

First electrode 40 may be fixed a distance apart from dielectric layer 44 and second electrode 42 to define a display volume 48 that holds a carrier fluid 50 having a plurality of colorant particles 52. In other words, display volume 48 and/or carrier fluid 50 having the plurality of colorant particles 52 may be disposed between first electrode 40 and dielectric layer 44 and/or second electrode 42. Carrier fluid 50 may include one or more polar fluids (e.g., water) and/or one or more non-polar fluids (e.g., dodecane). Additionally, or alternatively, carrier fluid 50 may include one or more anisotropic fluids, such as liquid crystal. Carrier fluid 50 also may include one or more surfactants (such as salts), charging agents, stabilizers, and dispersants. Additionally, carrier fluid 50 may include one or more dyed fluids, which may have a color different from the color of colorant particles 52.

First and second electrodes 40, 42 may be configured to selectively move the plurality of colorant particles 52 between a spread position S (as shown in FIG. 2) in which all or nearly all of the plurality of colorant particles may be out of the recessed regions and/or distributed or spread across display volume 48 to absorb and/or scatter incident light thereby creating a colored optical appearance ("colored state"), and a compacted position C (as shown in FIG. 3) in which all or nearly all of the plurality of colorant particles may be in the recessed regions thereby producing a clear optical appearance ("transparent state").

For example, first and second electrodes 40, 42 may apply an electric potential difference, which may result in moving plurality of colorant particles 52 to the compacted position. Transverse solid lines of arrows in FIG. 3 may indicate electric field lines, while dashed lines of arrows leading into the recess regions may indicate the flow of plurality of colorant particles 52 following the electrostatic and convective flows. To switch display element 38 from the clear state to the dark state, the polarity of the voltage may be reversed. That reversal may induce convective flow in the opposite direction and colorant particles 52 may no longer be electrically contained in the recessed regions. As a result, plurality of colorant particles 52 may be mass transported to display volume 24 and then may spread relatively evenly throughout the display volume.

The convective flow may be induced by ionic mass transport in carrier fluid 50 and charge transfer between carrier fluid 50 and electrodes 40, 42. The charge transfer may occur when carrier fluid 50 is coupled to electrodes 40, 42 either through direct contact with the electrodes or separated from the electrodes by an intermediate layer comprising one or more materials. In the latter case, charge transfer may be facilitated by the internal electrical conductivity of the intermediate layer, either volumetric or via pinholes and other defects.

Alternatively, the convective flow may be a transient effect caused by the ionic mass transport in carrier fluid 50, but without charge transfer between the carrier fluid and the electrode. In this case, the convective flow may proceed for a finite amount of time and may facilitate the compaction of colorant particles 52 in the recessed regions. After that colorant particles 52 may be contained in the recessed regions by electrostatic forces generated by a coupling with the electrodes. Convection within display element 38 may also be induced by other means. For example, convective flow can be induced by an electrokinetic means, a mechanical means (e.g., mechanical pistons), temperature gradients (e.g., heating of the sources and sinks, focused radiation), chemical potential gradients, as well as other means.

Figure 4:
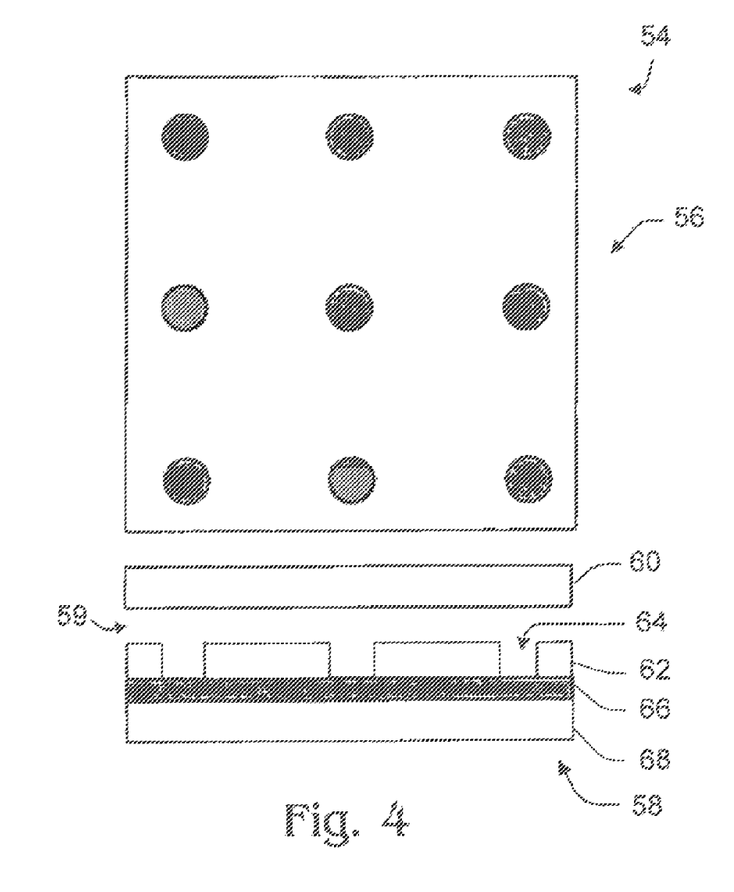
FIG. 4 is a block diagram of an example of the display element of FIG. 2, showing a dot structure in accordance with an embodiment of the invention.

FIG. 4 shows an example of a display element, which is generally indicated at 54, having a dot structure for the recessed regions. Unless specifically excluded, display element 54 may include one or more components and/or one or more functions of the other display elements in this disclosure. Additionally, the layers of display element 54 shown in FIG. 4 are for illustration only and may not represent the relative size or thickness of each layer. FIG. 4 shows a top view 56 and a cross-sectional view 58 of display element 54. Display element 54 may be a segment, a pixel, a sub-pixel, or a super-pixel having two or more pixels of electro-optical display system 20.

Display element 54 may include a display volume 59 defined by a first electrode 60, a dielectric layer 62 having a plurality of recessed regions 64, a second electrode 66 and a substrate 68. As shown in FIG. 4, recessed regions 64 may be shaped as dots and may be periodically distributed. Each dot-shaped recess region patterned into dielectric layer 62 may connect display volume 59 to second electrode 66. Display element 54 also may include another substrate (not shown) on which first electrode 60 is disposed. Although recessed regions 64 are shown to be periodically distributed, the recessed regions may alternatively, or additionally, be aperiodically or stochastically distributed.

Figure 5:
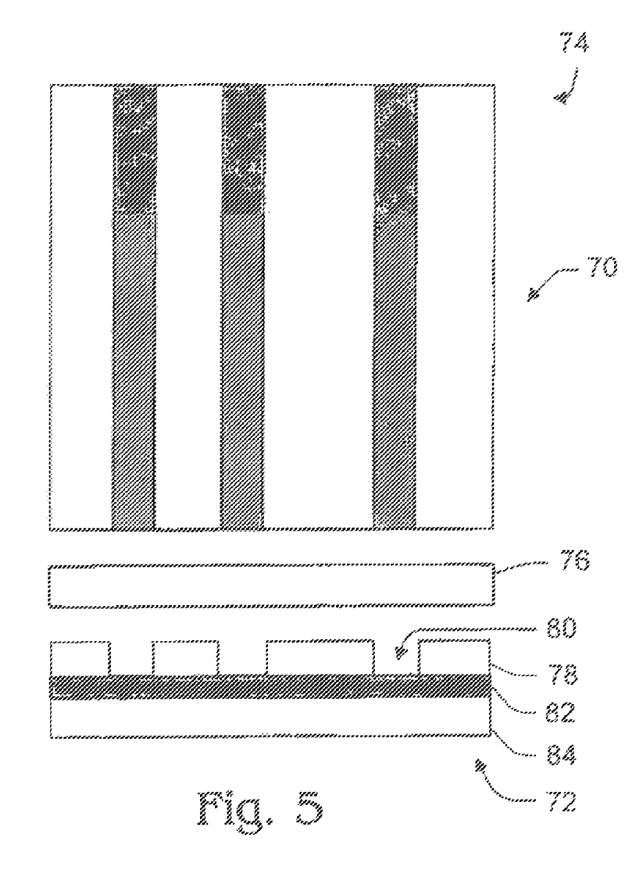
FIG. 5 is a block diagram of an example of the display element of FIG. 2, showing a line structure in accordance with an embodiment of the invention.

Additionally, although recessed regions 64 are shown to be in the form of dots, the recessed regions may alternatively, or additionally, include any suitable shape(s). For example, FIG. 5 shows a top view 70 and a cross-sectional view 72 of a display element 74 having a dielectric layer with recessed regions that are in the form of lines or linear channels, which may be periodically or aperiodically distributed. Unless specifically excluded, display element 74 may include one or more components and/or one or more functions of the other display elements in this disclosure. Additionally, the layers of display element 74 shown in FIG. 5 are for illustration only and may not represent the relative size or thickness of each layer. Display element 74 may include a first electrode 76, a dielectric layer 78 having a plurality of recessed regions 80, a second electrode 82 and a substrate 84. Additionally, display element 74 may include another substrate (not shown) on which first electrode 76 is disposed.

Figure 6:
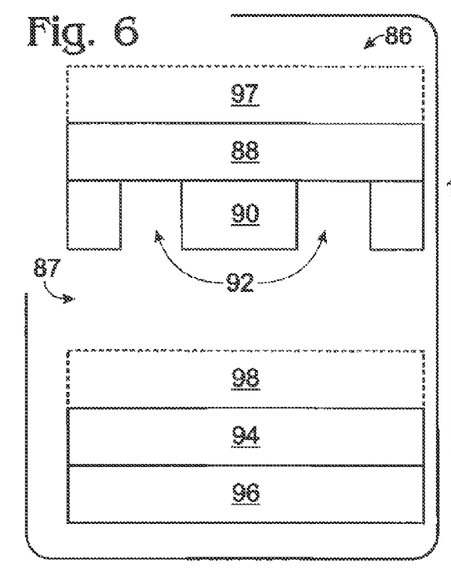
FIG. 6 is a block diagram of an example of the display element of FIG. 2 in accordance with an embodiment of the invention.

FIG. 6 shows another example of a display element for an electro-optical display system, generally indicated at 86. Display element 86 may be a segment, a pixel, a sub-pixel, or a super-pixel having two or more pixels of an electro-optical display system. Unless specifically excluded, display element 86 may include one or more components and/or one or more functions of the other display elements in this disclosure. Additionally, the layers of display element 86 shown in FIG. 6 are for illustration only and may not represent the relative size or thickness of each layer.

Display element 86 may include a display volume 87 defined by a first electrode or first conductor layer 88, a dielectric layer 90 having recessed regions 92, a second electrode or second conductor layer 94, and a bottom substrate 96. First conductor layer 88 and dielectric layer 90 may be configured to be transparent. Second conductor layer 94 may be configured to be reflective (also may be referred to as a "reflective conductor layer). The reflective conductor layer may be configured to reflect one or more wavelengths of light in any suitable way(s), such as diffusely reflecting those wavelengths of light. The reflective conductor layer may include a single layer (that may include reflecting particles, surfaces and/or other characteristics), or may include two or more layers (with one or more of those layers including reflecting particles, surfaces and/or other characteristics), as further discussed below.

Display element 86 also may include a top substrate 97 on which first electrode 88 is disposed. Additionally, display element 86 may include a passivation layer 98, which may include any chemical or mechanical layer configured to improve robustness of second electrode 94. For example, passivation layer 98 may include an organic layer, such as parylene coating, and/or an inorganic layer, such as silicon dioxide, silicon nitride, aluminum oxide, and/or hafnium oxide, etc. Passivation layer 98 may be any suitable thickness, such as a few nanometers to a few micrometers, that may still allow for charge transfer when required by the particular electrokinetic technology used. Passivation layer 98 also may enhance reflection. For example, passivation layer 98 may include silicon dioxide or silicon nitride (e.g., enhanced aluminum reflector) configured to enhance reflectance, while protecting the reflective surface. Passivation layer 98 may need to have its thickness and/or index optimized to provide higher reflectivity.

Figure 7:
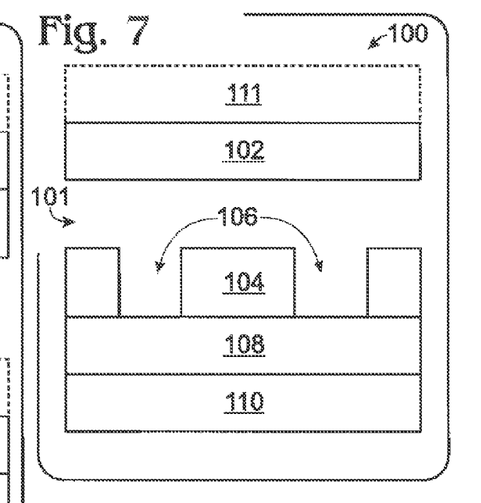
FIG. 7 is a block diagram of an example of the display element of FIG. 2 in accordance with an embodiment of the invention.

FIG. 7 shows another example of a display element for an electro-optical display system, generally indicated at 100. Display element 100 may be a segment, a pixel, a sub-pixel, or a super-pixel having two or more pixels of an electro-optical display system. Unless specifically excluded, display element 100 may include one or more components and/or one or more functions of the other display elements in this disclosure. Additionally, the layers of display element 100 shown in FIG. 7 are for illustration only and may not represent the relative size or thickness of each layer.

Display element 100 may include a display volume 101 defined by a first electrode or first conductor layer 102, a dielectric layer 104 having recessed regions 106, a second electrode or second conductor layer 108, and a bottom substrate 110. First conductor layer 102 and dielectric layer 104 may be configured to be transparent. Second conductor layer 108 may be configured to be reflective, such as diffusely reflective. Display element 100 also may include a top substrate 111 on which first conductor layer 102 is disposed.

Figure 8:
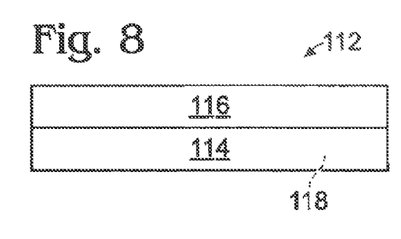
FIG. 8 is a block diagram of an example of a conductor layer of the display element of FIG. 6 or FIG. 7 in accordance with an embodiment of the invention.

FIG. 8 shows an example of a conductor layer, generally indicated at 112, which may include structured surfaces configured to reflect and/or absorb at least one wavelength of light. Unless specifically excluded, conductor layer 112 may include one or more components and/or one or more functions of the other conductor layers in this disclosure. Additionally, the layers of conductor 112 layer shown in FIG. 8 are for illustration only and may not represent the relative size or thickness of each layer.

Conductor layer 112 may include a base layer 114 and a metallic layer 116. Base layer 114 may be any suitable dielectric, semiconductive or conductive layer with one or more structured surfaces 118. Structured surfaces 118 may include structured scattering surfaces and/or structured absorptive surfaces. For example, base layer 114 may be a resin layer with structured surfaces 118. Structured surfaces 118 may include a textured surface, a porous surface, and/or other surfaces structured to function as a reflector (such as a white or color reflector) or an absorber (such as a black absorber). The scattering surfaces may be structured with stochastic and/or periodic surfaces of average pitch (ranging from about a submicron to about a few tens of microns) and/or undulation (ranging from about a submicron to about a few tens of microns).

The pitch and/or undulation of those surfaces may be configured to reflect all visible wavelengths of light or specific wavelength(s) of light. For example, the pitch may determine an angle over which light is diffusely scattered (which may affect the viewing angle), while the amplitude of the undulation may control how much of the light is diffusely rather than specularly reflected. The pitch and/or undulation of the surface may, for example, be configured to reflect the color white, red, blue, green and/or other suitable color(s). Additionally, a black absorbing surface may be formed when the surface is structured to be absorptive or anti-reflective for visible wavelengths of light with an average pitch on the subwavelength scale (i.e., a nanometer to a few hundred nanometers). Those surfaces may be structured via any suitable method(s), such as photolithography (e.g., using a mask of random dots), embossing, laser holography, self-assembly, etching, etc.

Metallic layer 116 may include any suitable metals configured to be reflective. For example, the metallic layer may include silver, aluminum, gold, copper, nickel, platinum and/or rhodium, alloys of those metals, multi-layer structures of those metals and/or their alloys, and/or any suitable combinations with dielectric layers to further enhance reflective properties. Metallic layer 116 may be formed on the base layer via any suitable techniques, such as physical vapor deposition, chemical vapor deposition, atomic layer deposition, electroplating, etc. Although FIG. 8 shows conductor layer 112 having base layer 114 with structured surfaces 118 and metallic layer 116, the conductor layer may alternatively be a single metallic layer having those structured surfaces.

Figure 9:
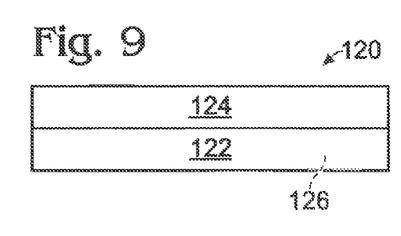
FIG. 9 is a block diagram of an example of a conductor layer of the display element of FIG. 6 or FIG. 7 in accordance with an embodiment of the invention.

FIG. 9 shows another example of a conductor layer, generally indicated at 120, which may include embedded particles configured to reflect and/or absorb at least one wavelength of light. Unless specifically excluded, conductor layer 120 may include one or more components and/or one or more functions of the other conductor layers in this disclosure. Additionally, the layers of conductor layer 120 shown in FIG. 9 are for illustration only and may not represent the relative size or thickness of each layer.

Conductor layer 120 may include any suitable structure configured to make the layer reflective and/or absorptive. For example, conductor layer 120 may include a base layer 122 and a transparent conductive layer 124. Base layer 122 may be any suitable dielectric, semiconductive or conductive layer with one or more embedded particles 126. Embedded particles 126 may include scattering particles and/or absorptive particles. For example, base layer 122 may be a resin layer with the scattering or absorbing particles. Embedded particles 126 may be configured to reflect and/or absorb one or more wavelengths of light. For example, embedded particles 126 may be configured to reflect or absorb white (or all colors) or any other suitable color(s). Examples of suitable transparent conducting materials may include (1) inorganic transparent conductors, such as indium tin oxide (ITO) (which can be used to dissipate charge in a hybrid electrode), indium zinc oxide (IZO), etc.; (2) organic transparent conductors, such as polyethylene dioxythiophene (PEDOT), polyacetylene (PAc), polyaniline (PAni), etc.; (3) a subwavelength structured metal layer; (4) a thin transparent metal layer (i.e., a metal layer having from 80% to 90% transparency); and/or (5) a network of nanostructures, such as carbon nanotubes, silver nanowires, etc.

Any suitable scattering particles may be used, including metal oxide particles (such as titanium oxide, aluminum oxide and silicon dioxide), polytetrafluoroethylene powders, polytetrafluoroethylene variant powders or particles, cesium oxide, organic polymer particles (such as silicone resin particles and polystyrene resin particles), sulfate particles (such as barium sulfate), carbonate particles (such as calcium carbonate) and/or other suitable particles. Additionally, or alternatively, any suitable absorptive particles may be used, including carbon black, bone black (carbon black+calcium phosphate), copper chromite black, synthetic iron oxide black, chromium iron oxide black, and organic black pigments, such as perylene black and their variants (including their combinations or encapsulated black particles).

The particles above may be embedded via any suitable technique(s), including mixing, milling, ink-jetting, screen printing, spin coating, etc. For example, titanium oxide or carbon black may be mixed with ultraviolet or thermally curable resin and then cured with the resin. Although FIG. 9 shows conductor layer 120 having base layer 122 with embedded particles 126 and transparent conductive layer 124, the conductor layer may alternatively be a single conductive resin layer having those embedded particles.

Figure 10:
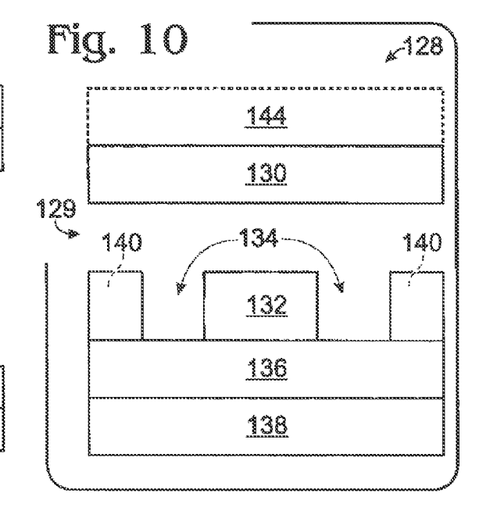
FIG. 10 is a block diagram of an example of the display element of FIG. 2 in accordance with an embodiment of the invention.

FIG. 10 shows another example of a display element for an electro-optical display system, generally indicated at 128, which may include a dielectric layer configured to reflect and/or absorb at least one wavelength of light. Display element 128 may be a segment, a pixel, a sub-pixel, or a super-pixel having two or more pixels of an electro-optical display system. Unless specifically excluded, display element 128 may include one or more components and/or one or more functions of the other display elements in this disclosure. Additionally, the layers of display element 128 shown in FIG. 10 are for illustration only and may not represent the relative size or thickness of each layer.

Display element 128 may include a display volume 129 defined by a first conductor layer 130, a reflective dielectric layer 132 having recessed regions 134, a second conductor layer 136, and a substrate 138. First conductor layer 130 may be configured to be transparent, while second conductor layer 136 may be configured to be either opaque or transparent.

Dielectric layer 132 may include one or more polytetrafluoroethylene variants, such as those variants that exhibit Lambertian reflective characteristics. Alternatively, or additionally, dielectric layer 132 may include one or more embedded colorant particles 140. Colorant particles 140 may include scattering particles and/or absorptive particles. The scattering particles may be configured to reflect any suitable wavelengths of light, such as the color white or any suitable color(s). When the colorant scattering particles are configured to reflect the color white, those particles may be referred to as "white scattering particles." The colorant scattering particles may include metal oxide particles (such as titanium oxide, aluminum oxide and silicon dioxide), polytetrafluoroethylene powders, polytetrafluoroethylene variant powders or particles, cesium oxide, organic polymer particles (such as silicone resin particles and polystyrene resin particles), sulfate particles (such as barium sulfate), carbonate particles (such as calcium carbonate) and/or other suitable particles configured to reflect any suitable wavelengths of light.

The embedded absorptive particles may be configured to absorb any suitable wavelength(s) or all wavelengths of light. When the absorbing particles are configured to absorb all color, those particles may be referred to as "black absorbing particles." The absorbing particles may include carbon black, bone black (carbon black+calcium phosphate), copper chromite black, synthetic iron oxide black, chromium iron oxide black, and organic black pigments, such as perylene black and their variants (including their combinations or encapsulated black particles).

The particles may be embedded and/or patterned via any suitable technique(s), including mixing, ink-jetting, screen printing, gravure coating, spin coating, spray coating, etc. For example, titanium oxide may be mixed with ultraviolet curable resin and then cured with the resin. Examples of other types of suitable resins include embossing, photopolymerizable, photocurable, or thermally curable resins. Examples of such resins include epoxy-based negative photoresist, such as SU8, or a base resin, such as a low viscosity aliphatic urethane diacrylate. Colorant particles 140 may additionally, or alternatively, include one or more colored dyes and/or pigments. For example, colorant particles 140 may include any suitable colored dye(s) and white scattering particles (or a white reflective conductor layer). Although dielectric layer 132 is shown to include particular structure configured to reflect one or more wavelengths of light, the dielectric layer may alternatively, or additionally, include any suitable structure. For example, dielectric layer 132 may include a multilayer stack of dielectric layers with alternating high and low refractive index layers to provide highly reflective properties for the specific wavelength(s) of interest. Dielectric layer 132 also may include any suitable structure having one or two dimensional surface grating structures configured to reflect the specific wavelength(s) of interest.

Display element 128 also may include a top substrate 144 on which first electrode 144 may be disposed on. Although the display elements described in this disclosure are shown to include a plurality of electrodes, the display elements may alternatively, or additionally, include electrokinetic elements, heating elements, microfluidic elements, micro-electromechanical elements, etc. Additionally, the structures and/or techniques shown for conductor or dielectric layers may be used on any suitable electrokinetic or electro-optical display system.

The layers discussed in this disclosure that are configured to reflect and/or absorb at least one wavelength of light may be used to create various color embodiments in the display elements described in this disclosure and/or other display elements of electro-optical display systems. For example, the display element may be configured with different transparent and colored states by using different colorant particles and/or different layers that are configured to reflect and/or absorb any suitable color(s), such as red, green, blue, cyan, magenta, yellow, white, spot color(s) [or color(s) matched to specific application(s)], a color different from the color of the colorant particles and/or fluid and/or other suitable color(s).

For example, the display element may switch between a spot color and a white color by using colorant particles having the spot color and a layer configured to reflect the color white. Additionally, the display element may switch between first and second colors by using colorant particles with a third color (where the third color combined with the first color results in the second color) and one or more layers configured to reflect the first color. Moreover, the display element may provide full color with a plurality of layers that are configured to reflect the color red, green, blue, white, cyan, magenta, yellow, and/or spot color(s).

Furthermore, the display element may switch between a spot color and a black color by using at least one layer configured to absorb a spot color and at least one layer configured to reflect the color white with black colorant particles. Additionally, the display element may switch between first and second colors by using at least one layer configured to absorb the first color, colorant particles with a third color (where the third color combined with the first color results in the second color), and at least one layer configured to reflect the color white. Additionally, the display element may provide full color with a plurality of layers that are configured to absorb various colors, such as red, green, blue and white, and layers configured to reflect the color white. Further variations of the above also are possible by using a transparent dielectric layer, a dyed dielectric layer or a dielectric layer with colorant particles.

Figure 11:
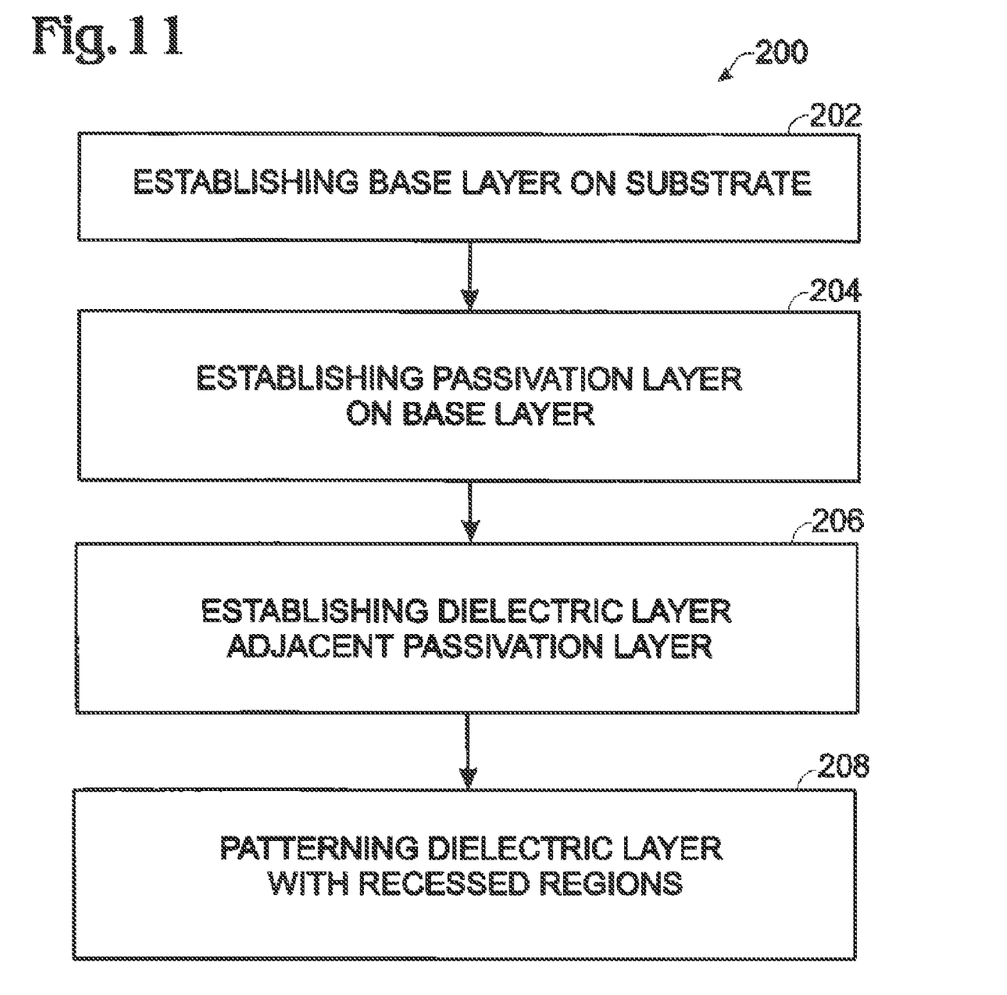
FIG. 11 is a flow chart showing an example of a method of manufacturing an electro-optical display system in accordance with an embodiment of the invention.

FIG. 11 shows an example of a method, which is generally indicated at 200, of manufacturing an electro-optical display system. While FIG. 11 shows illustrative steps of a method according to one example, other examples may omit, add to and/or modify any of the steps shown in that figure. As illustrated in FIG. 11, method 200 may include establishing a base layer on a substrate at 202. Establishing that base layer may include structuring one or more surfaces of the base layer, and/or depositing a metallic layer on the base layer. Alternatively, or additionally, establishing the base layer may include embedding the base layer with a plurality of colorant particles, such as scattering and/or absorptive particles.

A passivation layer may be established or formed on the base layer at 204. A dielectric layer may be established or formed adjacent the passivation layer at 206. For example, the dielectric layer may be formed on the passivation layer. Alternatively, the dielectric layer may be formed on a different layer that is adjacent the passivation layer (such as a conductor layer opposed from the passivation layer and across from a display volume of the display system). Establishing the dielectric layer may include establishing a dielectric layer that includes a polytetrafluoroethylene variant and/or establishing a dielectric layer that includes resin having a plurality of colorant particles, such as scattering and/or absorptive particles. The dielectric layer may be transparent. The dielectric layer may be patterned with recessed regions sized to contain a colorant species at 208. The base and/or dielectric layers may be configured to reflect at least one wavelength of light when the colorant species is contained in the recessed regions.

Electro-optical display system 20 also may include computer-readable media comprising computer-executable instructions for manufacturing an electro-optical display system, the computer-executable instructions being configured to perform one or more steps of method 200 discussed above.

We claim:

1. An electro-optical display system, comprising:
a plurality of electrodes;
a display volume containing a fluid having a plurality of colorant particles;
a layer adjacent to or part of at least one electrode of the plurality of electrodes and configured to at least one of (i) reflect at least one wavelength of light or (ii) absorb at least one wavelength of light;
a dielectric layer having two opposed surfaces, one of the opposed surfaces contacting one of the plurality of electrodes or the layer and an other of the opposed surfaces contacting the display volume; and
recessed regions defined in the dielectric layer and configured to contain the plurality of colorant particles, wherein the plurality of electrodes are configured to selectively move the plurality of colorant particles between a compacted position in which all or nearly all of the plurality of colorant particles are in the recessed regions, and a spread position in which the plurality of colorant particles are spread across the display volume.

2. The system of claim 1, wherein the layer comprises a conductor layer of the at least one electrode of the plurality of electrodes.

3. The system of claim 2, wherein the one of the two opposed surfaces of the dielectric layer contacts the one of the plurality of electrodes, and wherein the display volume is disposed between the dielectric layer and the conductor layer.

4. The system of claim 2, wherein the one of the two opposed surfaces of the dielectric layer contacts the conductor layer, and wherein the dielectric layer is disposed between the display volume and the conductor layer.

5. An electro-optical display system, comprising:
a plurality of electrodes;
a display volume containing a fluid having a plurality of colorant particles;
a dielectric layer having two opposed surfaces, one of the opposed surfaces contacting one of the plurality of electrodes and an other of the opposed surfaces contacting the display volume, the dielectric layer configured to at least one of (i) reflect at least one wavelength of light or (ii) absorb at least one wavelength of light; and
recessed regions defined in the dielectric layer and configured to contain the plurality of colorant particles, wherein the plurality of electrodes are configured to selectively move the plurality of colorant particles between a compacted position in which all or nearly all of the plurality of colorant particles are in the recessed regions, and a spread position in which the plurality of colorant particles are spread across the display volume.

6. The system of claim 5, wherein the dielectric layer includes embedded colorant absorbing particles.

7. The system of claim 5, wherein the dielectric layer includes a polytetrafluoroethylene variant.

8. An electro-optical display system, comprising:
a plurality of electrodes;
a display volume containing a fluid having a plurality of colorant particles;
a dielectric layer having two opposed surfaces, one of the opposed surfaces contacting one of the plurality of electrodes and an other of the opposed surfaces contacting the display volume; and
recessed regions defined in the dielectric layer and configured to contain the plurality of colorant particles;
wherein the plurality of electrodes are configured to selectively move the plurality of colorant particles between a compacted position in which all or nearly all of the plurality of colorant particles are in the recessed regions, and a spread position in which the plurality of colorant particles are spread across the display volume,
and wherein at least one of the plurality of electrodes includes a conductor layer having at least one of embedded particles and structured surfaces, the embedded particles and structured surfaces being configured to at least one of (i) reflect at least one wavelength of light or (ii) absorb at least one wavelength of light.

9. The system of claim 8, wherein the conductor layer includes a base layer with the embedded particles, the embedded particles including embedded absorbing particles.

10. The system of claim 9, wherein the base layer includes a conductive resin.

11. The system of claim 8, wherein the conductor layer includes a metallic layer and a base layer having the structured surfaces.

12. The system of claim 11, wherein the structured surfaces include at least one of structured scattering surfaces and structured absorbing surfaces.

13. The system of claim 8, wherein the conductor layer includes a passivation layer.

14. The system of claim 8, wherein the conductor layer includes a metallic layer having the structured surfaces.

15. The system of claim 5, wherein the dielectric layer includes embedded colorant scattering particles.

16. The system of claim 8, wherein the conductor layer includes a base layer with the embedded particles, the embedded particles including embedded scattering particles.

17. The system of claim 16, wherein the base layer includes a conductive resin.

18. The system of claim 8, wherein:
- the plurality of electrodes includes a top electrode and a bottom electrode;
- the bottom electrode is the at least one of the plurality of electrodes that includes the conductor layer;
- the one opposed surface of the dielectric layer contacts the top electrode;
- the dielectric layer and the top electrode are transparent to the at least one wavelength of light; and
- the conductor layer is configured to reflect the at least one wavelength of light.

19. The system of claim 8, wherein:
- the plurality of electrodes includes a top electrode and a bottom electrode;
- the bottom electrode is the at least one of the plurality of electrodes that includes the conductor layer;
- the one opposed surface of the dielectric layer contacts the conductor layer;
- the top electrode and the dielectric layer are transparent to the at least one wavelength of light; and
- the conductor layer is configured to reflect the at least one wavelength of light.

* * * * *